W. L. FOURNIER.
SANDING DEVICE FOR VEHICLES.
APPLICATION FILED JAN. 21, 1922.
1,424,758.
Patented Aug. 8, 1922.
2 SHEETS—SHEET 2.
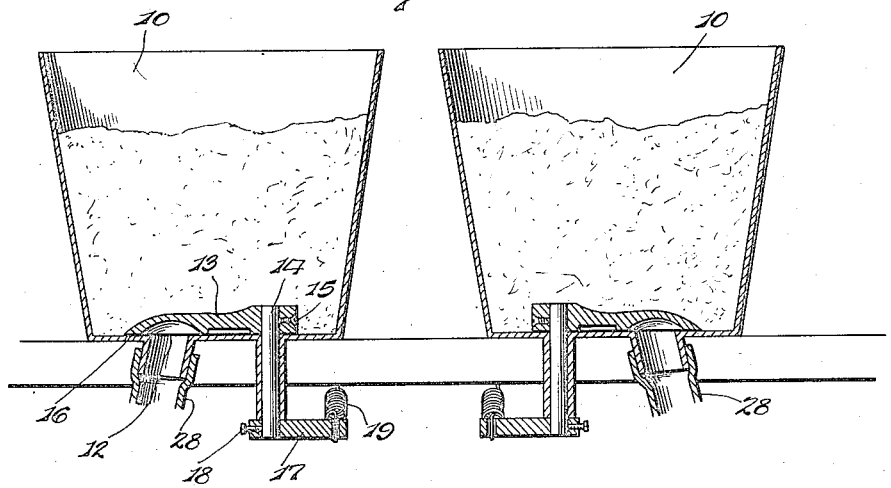
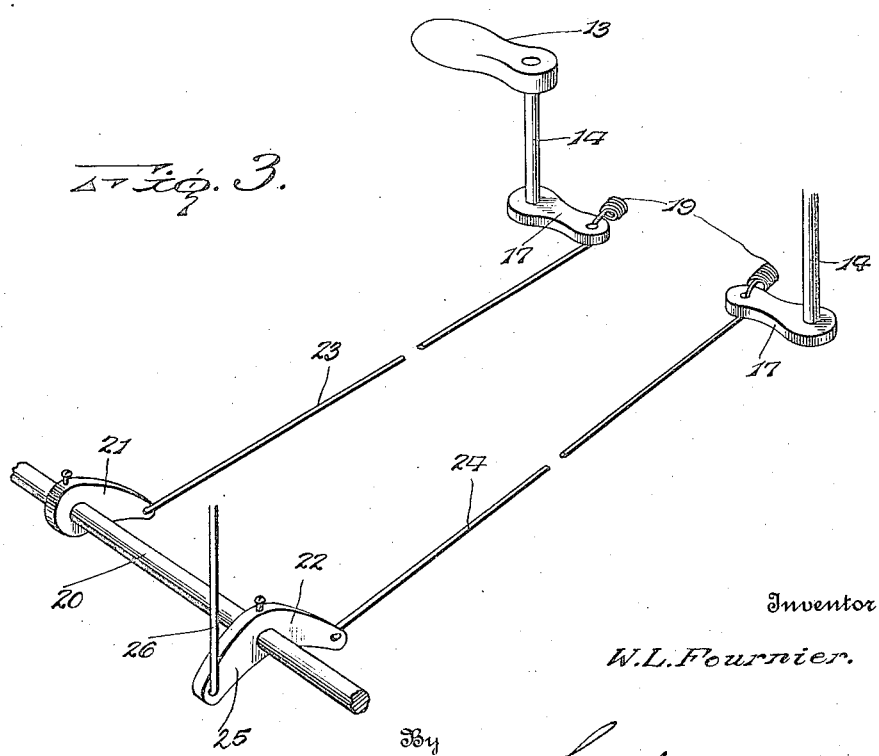
Inventor
W. L. Fournier.
By Lacey & Lacey, Attorneys

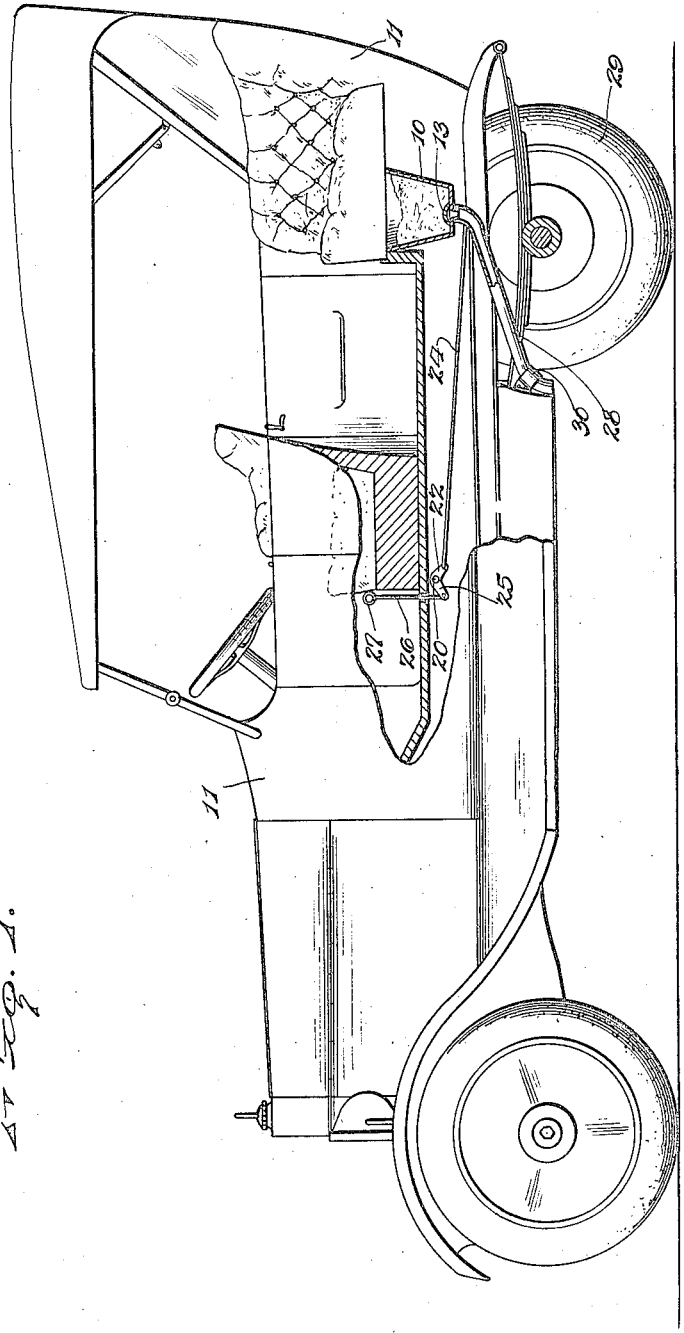

UNITED STATES PATENT OFFICE.

WILLIAM L. FOURNIER, OF SEATTLE, WASHINGTON.

SANDING DEVICE FOR VEHICLES.

1,424,758.      Specification of Letters Patent.     Patented Aug. 8, 1922.

Application filed January 21, 1922. Serial No. 530,363.

*To all whom it may concern:*

Be it known that I, WILLIAM L. FOURNIER, a citizen of the United States, residing at Seattle, in the county of King and State of Washington, have invented certain new and useful Improvements in Sanding Devices for Vehicles, of which the following is a specification.

My invention relates to a device for depositing sand in front of the wheels of a vehicle and the object of the invention is to provide in this manner, a good hold for the wheels on wet or slippery roadways, thereby preventing skidding.

Another object of the invention is to arrange the device in such a manner that it may be conveniently operated from the driver's seat and, in the case of automobiles, so that the sand may be deposited on the ground in the paths of the rear wheels of the automobiles and in front thereof.

Another object is to construct the device of very few parts and arrange them so that it will be practically impossible for them to get out of order.

In the accompanying drawings one embodiment of the invention has been illustrated and:

Figure 1 shows a side elevation, partly in section, of an automobile with my device installed, Figure 2 is a transverse section of the main parts of the invention shown on a larger scale, and Figure 3 is a perspective view of the operating details for the device.

A pair of receptacles 10 for sand are positioned above the rear axle of an ordinary automobile, indicated by the numeral 11, and preferably under the rear seat of the automobile. Each of these receptacles is preferably made from tin plate and tapers toward the bottom in which an aperture 12 is provided. Over this aperture is disposed a shutter 13 pivoted on a pin 14 in the frame of the automobile, which pin extends upwardly, and the shutter 13 is attached to this upper end of the pin by means of a set screw 15. The shutter is preferably hollowed out on its under side so as to form a narrow annular edge 16 slightly larger in diameter than the aperture 12 in the bottom of the receptacle. This is done for the purpose that sand deposited on the bottom of the receptacle may not interfere with the swinging movement of the shutter when the aperture is to be opened to deliver sand from the receptacle.

At the lower end of the pivot pin 14 is rigidly secured an arm 17 by means of a set screw 18, or in any other suitable manner. This arm 17 extends transversely of the automobile so that the two arms for the two receptacles 10 are pointing toward each other when the shutters 13 close the apertures 12. A coil spring 19 is attached at one end to the extremity of the arm 17 and at its other end to the frame of the automobile. This coil spring tends to hold the shutter in closed position.

In a convenient position adjacent to the front seat of the automobile is carried a shaft 20 running transversely of the automobile and provided with suitable bearings. On this shaft are secured a pair of levers one of which, indicated by the numeral 21, extends rearwardly and is connected to the arm 17 of one of the receptacles by means of a connecting wire or rod 23. The other lever 22 has a similar rearwardly extending arm connected to the arm 17 of the other receptacle by means of a wire or rod 24. This lever 22 is made in the form of a bell crank and its other arm 25 is directed forwardly and has attached to it a perpendicular rod 26 having a handle 27 at its upper end positioned conveniently for the driver of the automobile. This handle 27 may, in some cases, be attached to or disposed close to the emergency brake lever so that they may be operated together.

Under the aperture 12 of each of the receptacles 10, a pipe 28 is attached. This pipe, which may be made of flexible metal or rubber, terminates in front of one of the rear wheels 29 of the automobile and opens so as to deposit the sand in the path thereof. The end of the pipe is preferably secured, by means of a brace 30, to the adjacent portion of the mud guard or running board of the vehicle and to prevent injury to the end of the pipe it should not extend below the under side of the running board.

It will now be understood that to operate the device, all the driver of the automobile has to do is to pull the handle 27, when the bell crank 22 will partly turn the shaft 20 and oscillate the levers 21 and 22 thereof, pulling the wires 23 and 24 to thereby swing the arms 17 forward and cause the shutters to turn away from the apertures 12. As long as the driver pulls on the handle 27, the apertures will stand open and sand will be delivered to the pipes 28 to be deposited in front of the wheels 29. Directly the driver lets go of the handle 27, the springs 19 will close the apertures by swinging the shutters 13 back in position.

Depending upon the type of vehicle to which this sanding device is to be applied, the position of the receptacle has to be suited and its shape modified. I do not, for this reason, limit myself to the construction illustrated in the accompanying drawings. Consequently, one or more of the receptacles may be installed under the front seat of a vehicle or under the rear seat or possibly in the turtle-back of a roadster.

It is evident that as small a bottom as possible is desirable in the receptacle, provided there is room enough for the shutter 13 to operate and that an aperture is furnished which is not less in diameter than one and one-half inches for the sand to run out through. I have found that the best material for the tube 28 is flexible aluminum but I may at times use rubber, lead, or any other material which is suitable, depending on conditions.

Having thus described the invention, what is claimed as new is:

1. The combination with a wheeled vehicle; of a sand receptacle positioned adjacent one of the vehicle wheels and provided with a delivery aperture in its bottom, a channel leading from said aperture and adapted to conduct sand from the receptacle into the path of the wheel, a shutter for said aperture, a pivot for said shutter revolubly mounted in the body of said vehicle, an arm on said pivot, a spring for holding said shutter in closed position, and means connected with said arm to open the shutter.

2. The combination with a wheeled vehicle; of a sand receptacle positioned adjacent one of the vehicle wheels and provided with a delivery aperture in its bottom, a channel leading from said aperture and adapted to conduct sand from the receptacle into the path of the wheel, a shutter for said aperture, a pivot for said shutter revolubly mounted in the body of said vehicle, an arm on said pivot, a spring for holding said shutter in closed position, and means connected with said arm to open the shutter, said means including an operating handle, a bell crank having one end connected with said handle, and a tension member between the other end of the bell crank and said arm.

3. The combination with a wheeled vehicle; of a pair of sand receptacles positioned adjacent the rear wheels of the vehicle, each of said receptacles being provided with a delivery aperture in its bottom, a channel leading from said aperture and adapted to conduct sand from the receptacle into the path of one of the wheels, a shutter for said aperture, a pivot for said shutter revolubly mounted in the body of the vehicle, an arm for said pivot, a spring for holding said shutter in closed position, and means connected with said arm to open the shutter.

4. The combination with a wheeled vehicle; of a pair of sand receptacles positioned adjacent the rear wheels of the vehicle, each of said receptacles being provided with a delivery aperture in its bottom, a channel leading from said aperture and adapted to conduct sand from the receptacle into the path of one of the wheels, a shutter for said aperture, a pivot for said shutter revolubly mounted in the body of the vehicle, an arm for said pivot, a spring for holding said shutter in closed position, and means connected with said arm to open the shutter, said means including an operating handle, a cross shaft, a bell crank on said cross shaft and having one end connected with said handle, a tension member between the other end of the bell crank and the arm of one of said receptacles, a lever rigidly attached to said cross shaft, and a second tension member between said lever and the arm of said other receptacle; whereby upon said handle being pulled, said bell crank and said lever will respectively operate each of the shutters through the intermediary of said tension members, levers, and pivots.

In testimony whereof I affix my signature.

WILLIAM L. FOURNIER. [L. S.]